United States Patent
Yamamura et al.

(10) Patent No.: US 12,142,863 B2
(45) Date of Patent: Nov. 12, 2024

(54) BRANCH CONNECTOR HAVING SHORTING PLATE CONNECTED TO A PAIR OF TERMINAL FITTINGS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Makoto Yamamura, Mie (JP); Yuka Koizumi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 320 days.

(21) Appl. No.: 17/767,048

(22) PCT Filed: Aug. 21, 2020

(86) PCT No.: PCT/JP2020/031616
§ 371 (c)(1),
(2) Date: Apr. 7, 2022

(87) PCT Pub. No.: WO2021/079604
PCT Pub. Date: Apr. 29, 2021

(65) Prior Publication Data
US 2022/0302618 A1  Sep. 22, 2022

(30) Foreign Application Priority Data
Oct. 23, 2019  (JP) .................. 2019-192721

(51) Int. Cl.
*H01R 12/75* (2011.01)
*H01R 11/01* (2006.01)
(Continued)

(52) U.S. Cl.
CPC ............. *H01R 12/75* (2013.01); *H01R 11/01* (2013.01); *H01R 11/09* (2013.01); *H01R 13/4223* (2013.01); *H01R 13/11* (2013.01)

(58) Field of Classification Search
CPC ............ H01R 13/6485; H01R 13/4223; H01R 13/11; H01R 12/75; H01R 11/01; H01R 11/09
See application file for complete search history.

(56) References Cited

U.S. PATENT DOCUMENTS

| 5,741,147 A | 4/1998 | Konoya et al. |
| 5,743,760 A * | 4/1998 | Inaba ................. H01R 13/7031 439/489 |

(Continued)

FOREIGN PATENT DOCUMENTS

| JP | H03-068309 U | 7/1991 |
| JP | H06-310183 A | 11/1994 |

OTHER PUBLICATIONS

International Search Report issued on Oct. 27, 2020 for WO 2021/079604 A1 (4 pages).

*Primary Examiner* — Marcus E Harcum
(74) *Attorney, Agent, or Firm* — Venjuris, P.C.

(57) ABSTRACT

It is aimed to shorten a stub length and realize miniaturization. A branch connector (10) includes a pair of terminal fittings (30), a terminal holding member (12) and a shorting member (46). The pair of terminal fittings 30 are fixed to a divided portion (52) at an intermediate position of a conductive path (51A, 51B). The terminal holding member (12) accommodates the pair of terminal fittings (30). The shorting member (46) is disposed along an outer surface of the terminal holding member (12) and connected to the pair of (Continued)

terminal fittings (30). A branch-side terminal (63) is connectable to the terminal fitting (30).

4 Claims, 7 Drawing Sheets

(51) Int. Cl.
  *H01R 11/09* (2006.01)
  *H01R 13/422* (2006.01)
  *H01R 13/11* (2006.01)

(56) References Cited

U.S. PATENT DOCUMENTS

| | | | | |
|---|---|---|---|---|
| 5,820,399 | A * | 10/1998 | Shirouzu | H01R 13/6275 439/352 |
| 6,036,515 | A * | 3/2000 | Nakamura | H01R 13/7032 439/489 |
| 6,439,914 | B2 * | 8/2002 | Nimura | H01R 13/639 439/352 |
| 6,827,596 | B2 * | 12/2004 | Hori | H01R 13/6275 439/489 |
| 7,275,946 | B2 * | 10/2007 | Ohtaka | H01R 13/7032 439/595 |
| 7,294,015 | B2 * | 11/2007 | Fujii | H01R 13/641 439/489 |
| 9,214,756 | B2 * | 12/2015 | Nishio | H01R 13/5213 |
| 9,379,472 | B2 * | 6/2016 | Hara | H01R 13/46 |
| 2004/0102086 | A1 | 5/2004 | Bigotto | |
| 2007/0149041 | A1 * | 6/2007 | Fujii | H01R 13/641 439/489 |
| 2008/0220639 | A1 * | 9/2008 | Ohara | H01R 13/641 439/752 |
| 2012/0149226 | A1 * | 6/2012 | Ishibashi | H01R 13/5221 439/271 |
| 2012/0225574 | A1 * | 9/2012 | Nakamura | H01R 13/641 439/507 |
| 2018/0115110 | A1 * | 4/2018 | Fujii | H01R 13/639 |
| 2018/0123301 | A1 | 5/2018 | Tsukamoto | |

* cited by examiner

BRANCH CONNECTOR HAVING SHORTING PLATE CONNECTED TO A PAIR OF TERMINAL FITTINGS

CROSS REFERENCE TO RELATED APPLICATIONS

This application is a national phase of PCT application No. PCT/JP2020/031616, filed on 21 Aug. 2020, which claims priority from Japanese patent application No. 2019-192721, filed on 23 Oct. 2019, all of which are incorporated herein by reference.

TECHNICAL FIELD

The present disclosure relates to a branch connector.

BACKGROUND

Patent Document 1 discloses a branch structure for branching a branch line harness including a plurality of branch lines from a main line harness in which a plurality of main lines are arranged in parallel. This branch structure is composed of connection terminals constituting the main lines, a circuit board formed with a conductor pattern and a connector including connection pins. The connection terminals are connected to the conductor pattern by being mounted on the circuit board. By mounting the connector on the circuit board, the connection pins are connected to the conductor pattern. The branch lines are connected to the connection pins. By the above configuration, the main lines and the branch lines are connected.

PRIOR ART DOCUMENT

Patent Document

Patent Document 1: JP 2018-074705 A

SUMMARY OF THE INVENTION

Problems to be Solved

Since the circuit board and the connection pins are interposed between the main lines and the branch lines in this branch structure, there is a problem that a stub length becomes long. Further, since the circuit board needs to have a space for forming the conductor pattern, there is a problem of enlarging the circuit board.

A branch connector of the present disclosure was completed on the basis of the above situation and aims to shorten a stub length and realize miniaturization.

Means to Solve the Problem

The present disclosure is directed to a branch connector with a pair of terminal fittings fixed to a divided portion at an intermediate positions of a conductive path, a terminal holding member for holding the pair of terminal fittings, and a plate-like shorting member disposed along an outer surface of the terminal holding member, the shorting member being connected to the pair of terminal fittings, a branch-side terminal being connectable to the terminal fitting.

Effect of the Invention

According to the present disclosure, it is possible to shorten a stub length and realize miniaturization.

DETAILED DESCRIPTION TO EXECUTE THE INVENTION

Description of Embodiments of Present Disclosure

First, embodiments of the present disclosure are listed and described.

(1) The branch connector of the present disclosure includes a pair of terminal fittings fixed to a divided portion at an intermediate positions of a conductive path, a terminal holding member for holding the pair of terminal fittings, and a plate-like shorting member disposed along an outer surface of the terminal holding member, the shorting member being connected to the pair of terminal fittings, a branch-side terminal being connectable to the terminal fitting. According to the configuration of the present disclosure, since the pair of terminal fittings constituting the conductive path are connected via the shorting member, the conductive path is connected by daisy chain connection and a stub length is shortened. Since the branch-side terminal is directly connected to the terminal fitting constituting the conductive path, miniaturization can be realized as compared to the case where another member is interposed between the conductive path and the branch-side terminal. Since the shorting member is plate-like, miniaturization can be realized also by this configuration.

(2) A protecting member is preferably provided which covers the shorting member. According to this configuration, the shorting member can be protected by the protecting member.

(3) The shorting member is preferably held on an inner surface of the protecting member. According to this configuration, the shorting member can be protected by the protecting member even with the shorting member removed from the terminal holding member.

(4) The shorting member is preferably formed with resilient contact pieces capable of resiliently contacting the terminal fittings. According to this configuration, since dimensional tolerances of the respective components and assembling tolerances between the respective components are absorbed by the resilient deformation of the resilient contact pieces, a contact state between the shorting member and the terminal fittings is stabilized.

(5) In (4), the terminal holding member is preferably formed with connection holes for accommodating the resilient contact pieces. According to this configuration, since a clearance between the outer surface of the terminal holding member and the shorting member can be narrowed, miniaturization can be realized.

Details of Embodiment of Present Disclosure

Embodiment

One specific embodiment of a branch connector of the present disclosure is described below with reference to FIGS. 1 to 7. Note that the present invention is not limited to these illustrations and is intended to be represented by claims and include all changes in the scope of claims and in the meaning and scope of equivalents.

Figure 3:
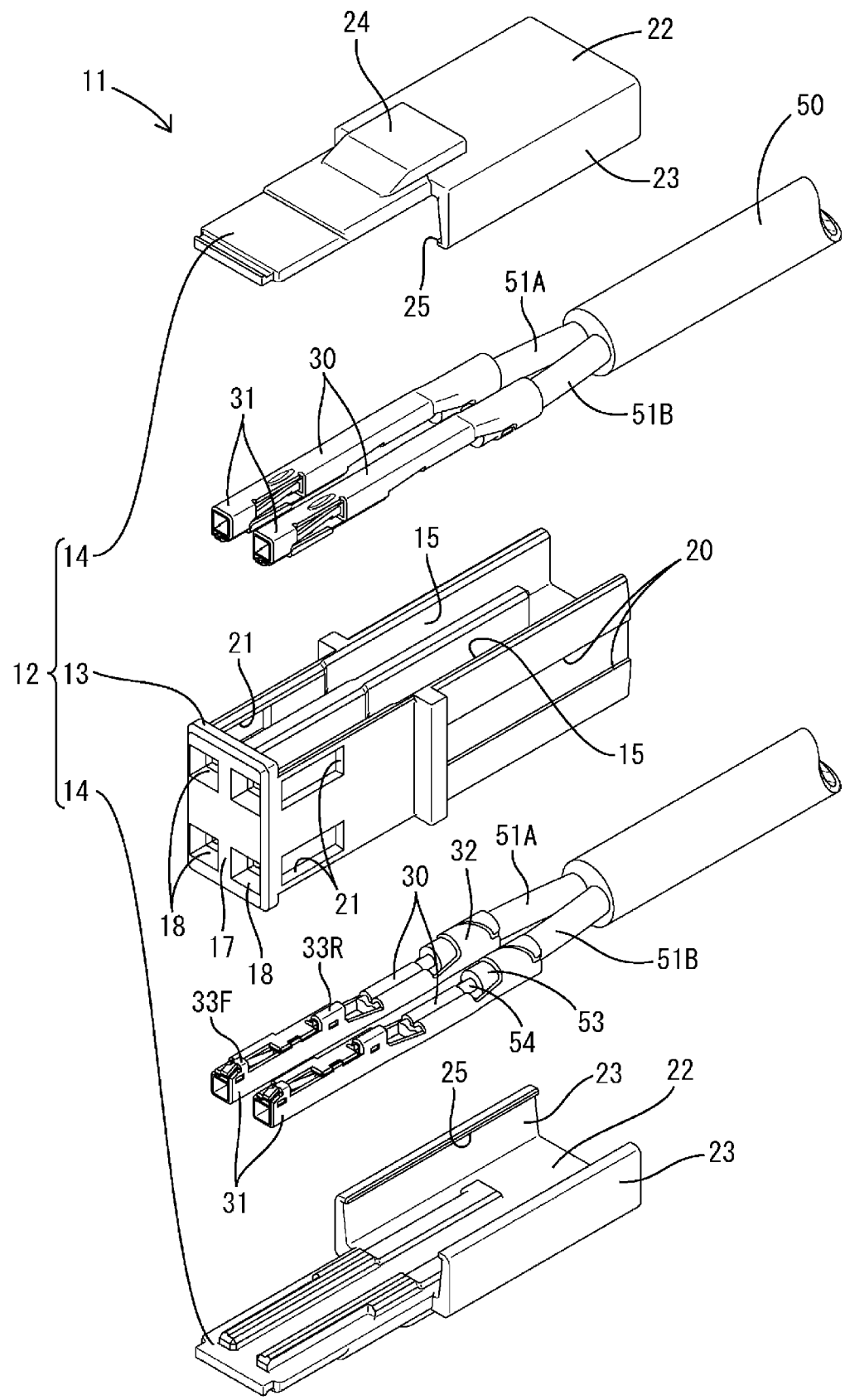
FIG. 3 is an exploded perspective view of an inner module.
Figure 4:
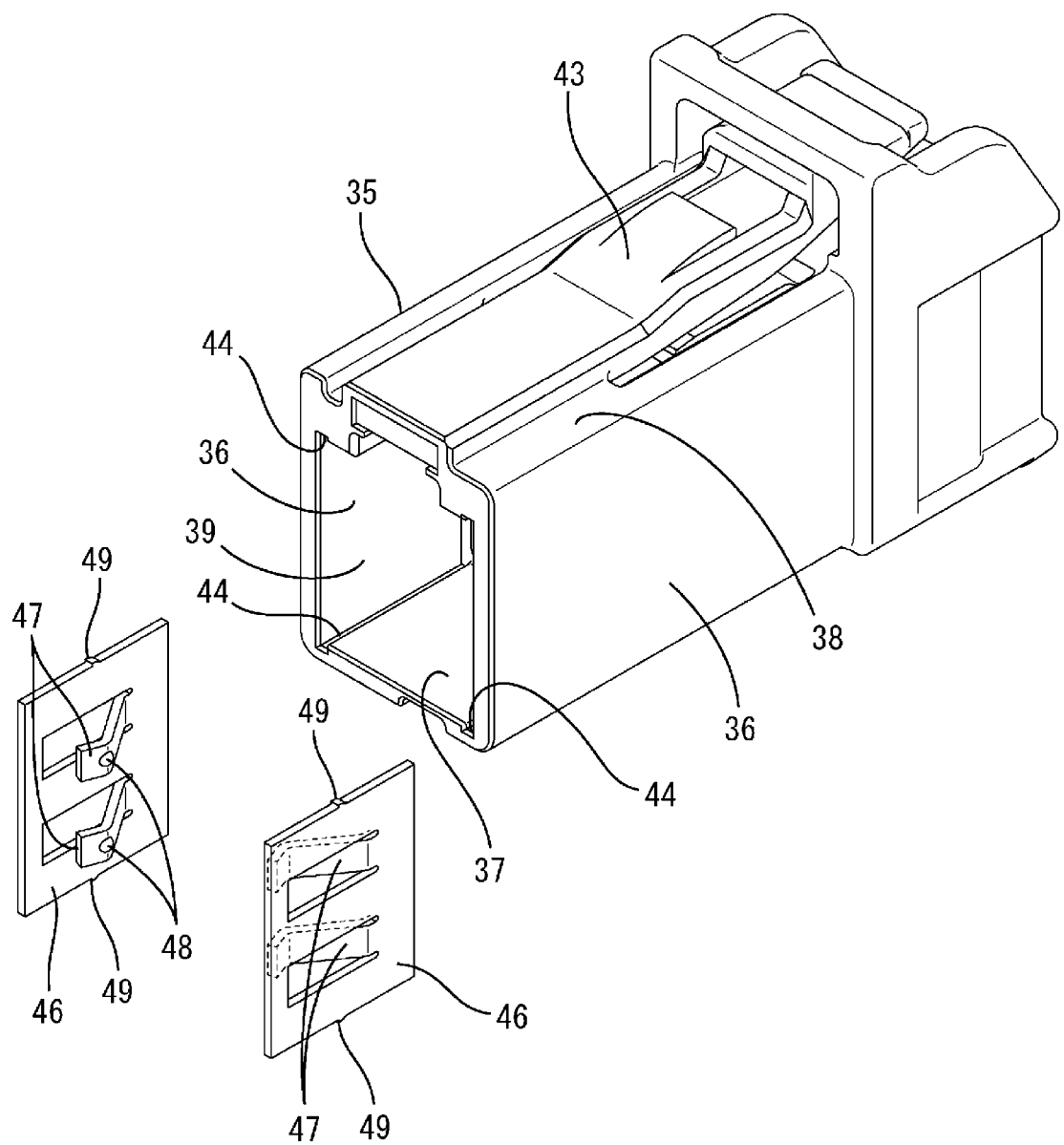
FIG. 4 is a perspective view showing a state where shorting members are removed from a branch housing.
Figure 5:
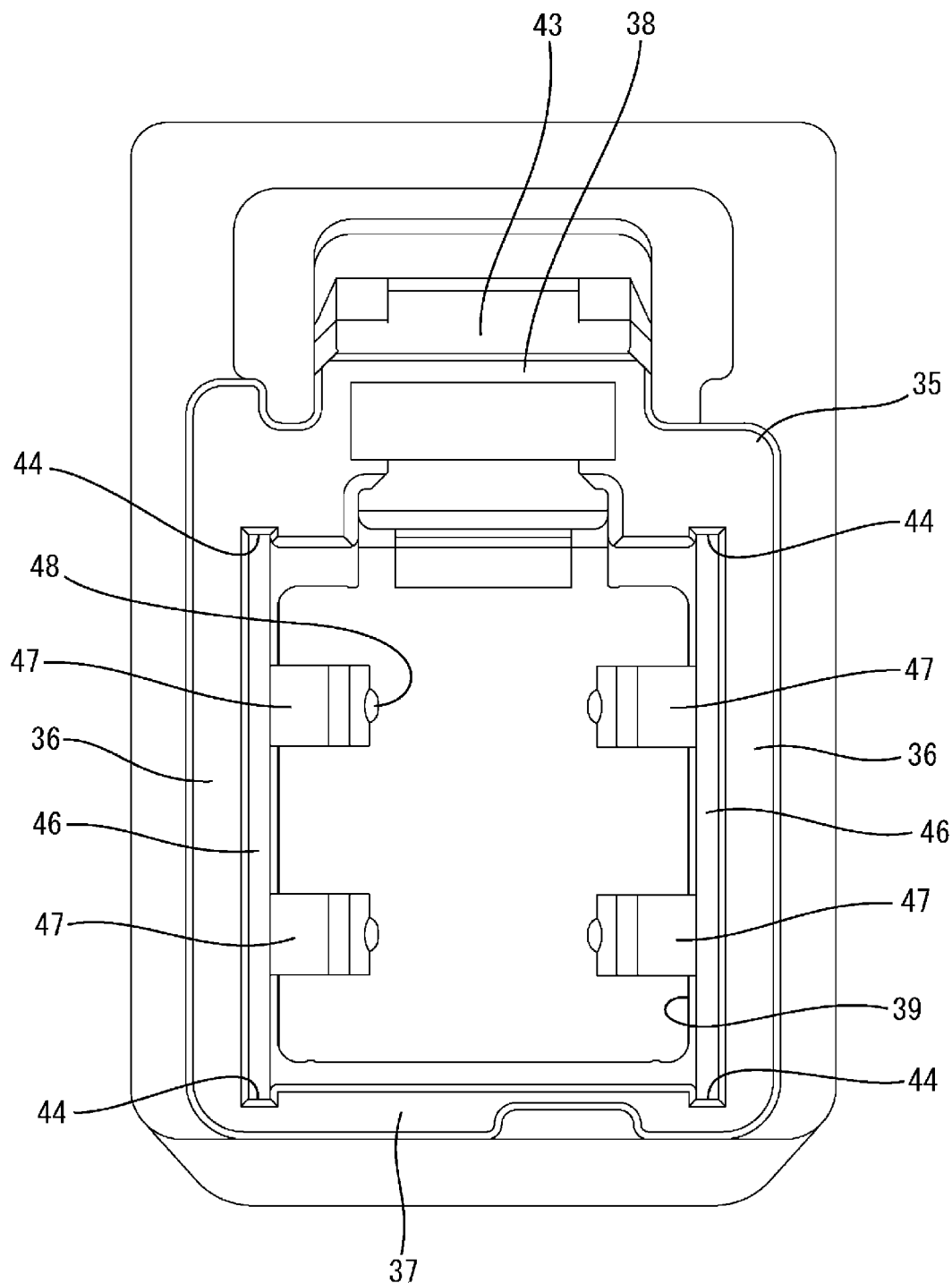
FIG. 5 is a front view of the branch housing.
Figure 6:
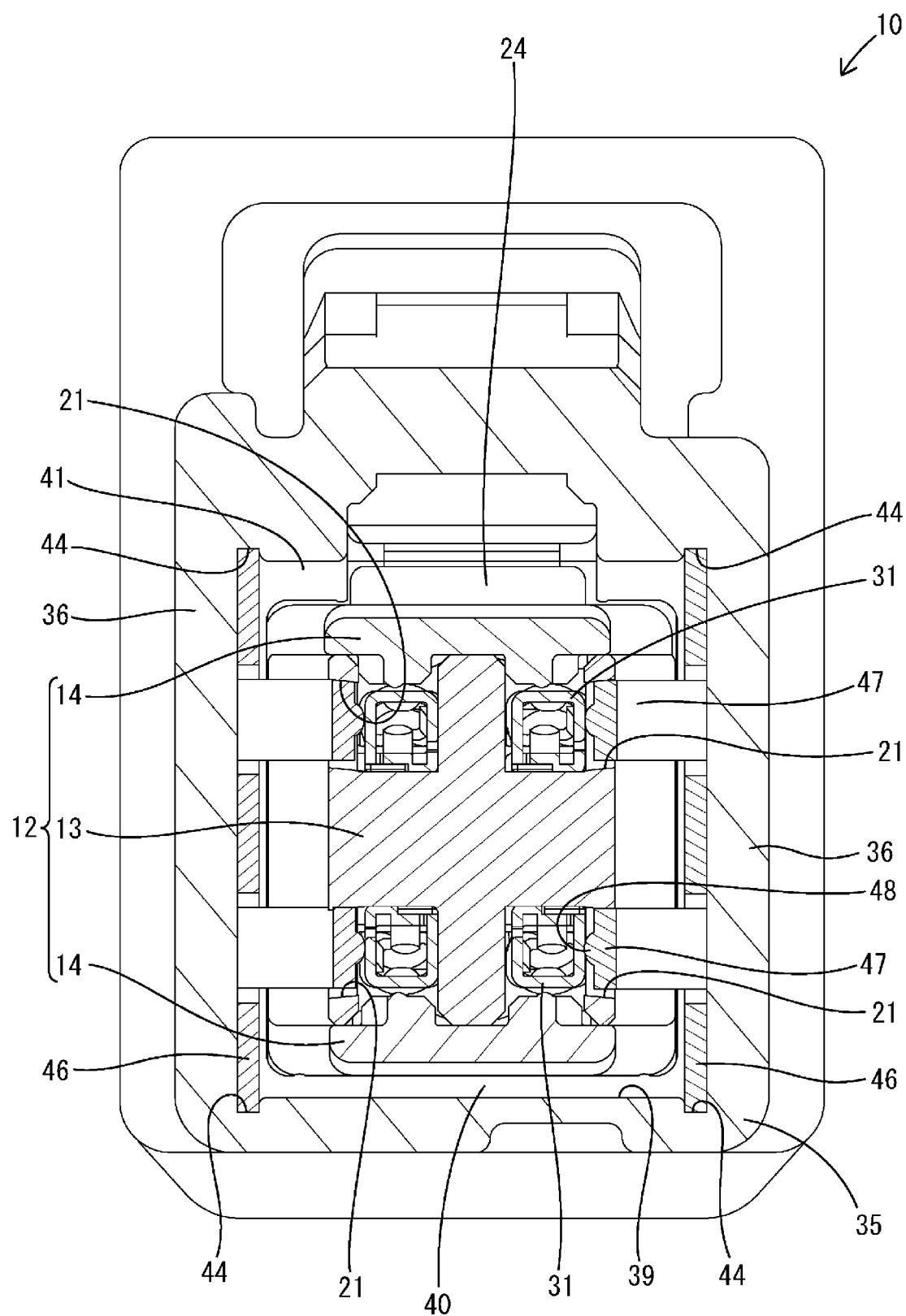
FIG. 6 is a front view in section of the branch housing.
Figure 7:
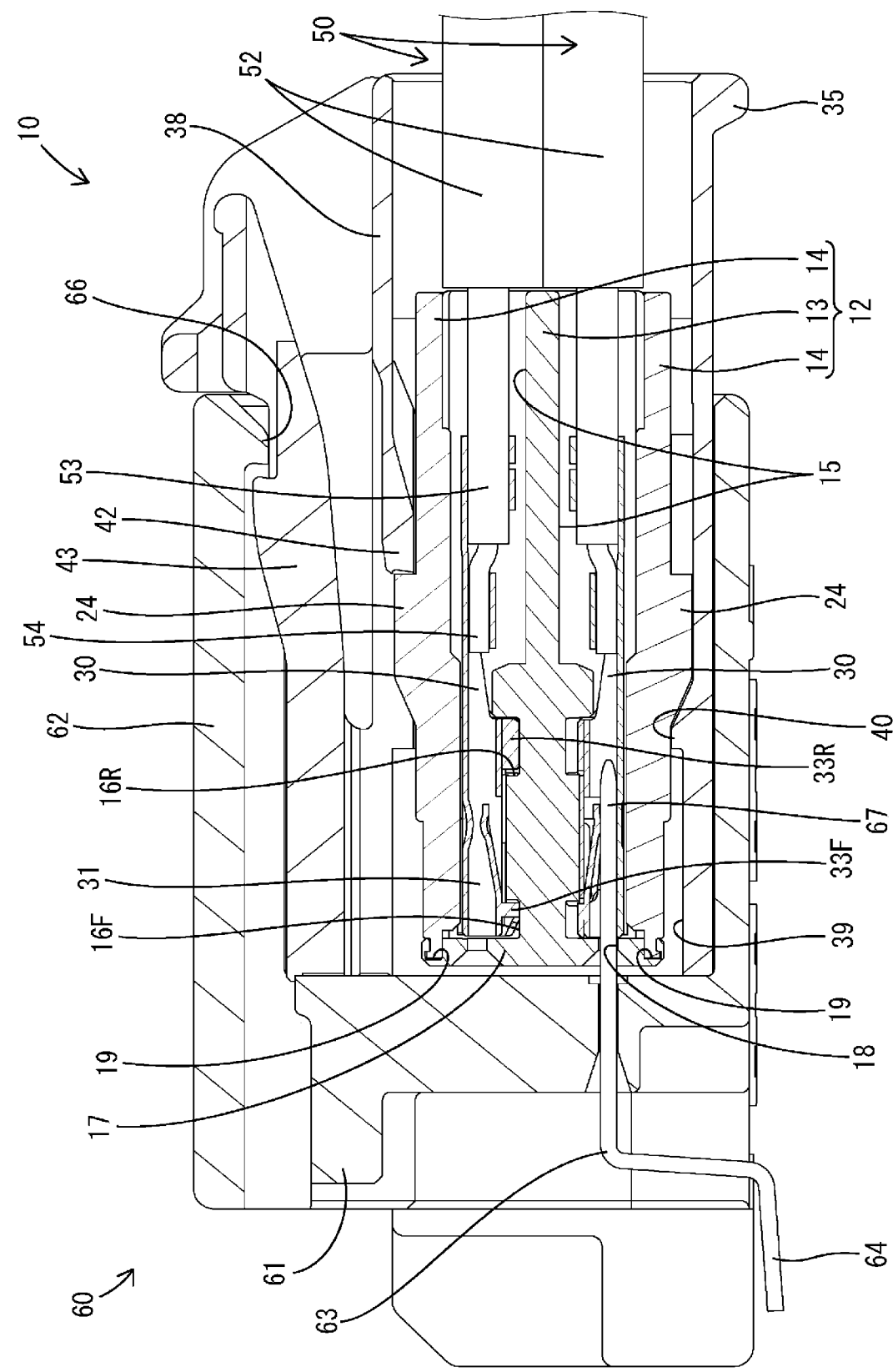
FIG. 7 is a side view in section showing a state where the branch connector and the board connector are connected.

In this embodiment, a left side in FIGS. 3, 4 and 7 is defined as a front side concerning a front-rear direction. Upper and lower sides shown in FIGS. 2 to 7 are directly defined as upper and lower sides concerning a vertical direction. Left and right sides shown in FIGS. 5 and 6 are directly defined as left and right sides concerning a lateral direction. The lateral direction is used as a synonym with a width direction.

Figure 1:
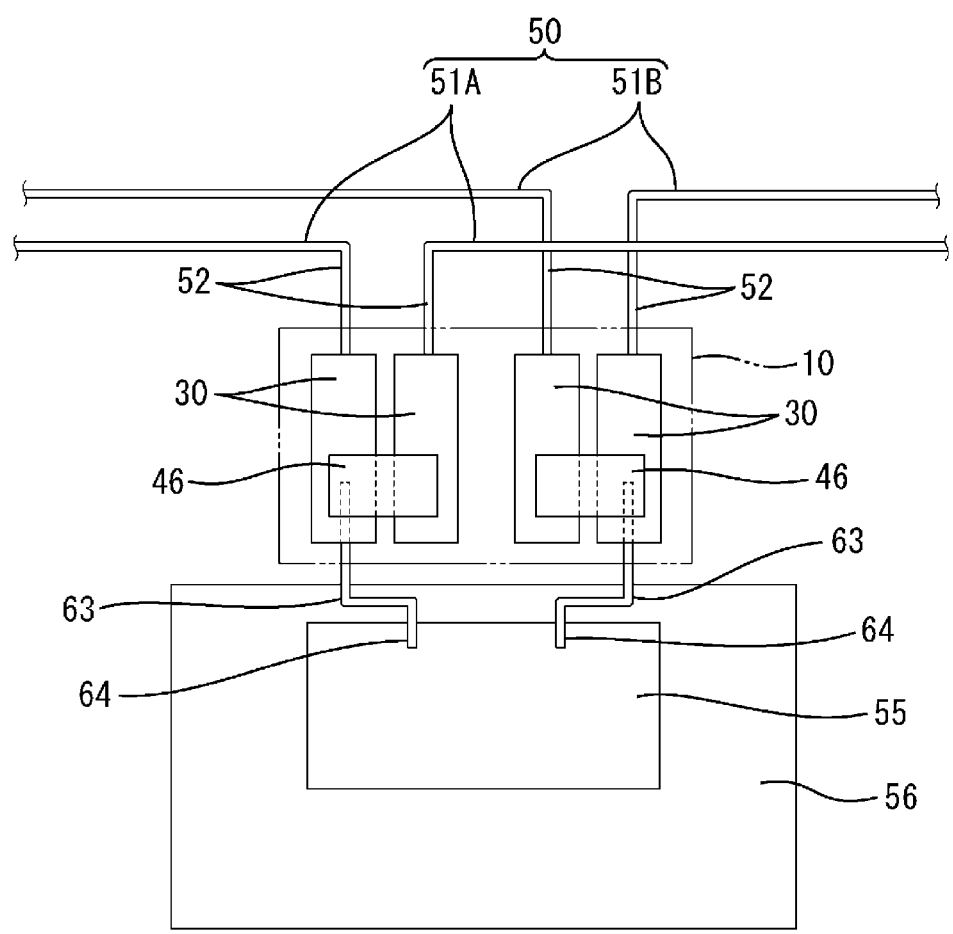
FIG. 1 is a configuration diagram of a branch structure using a branch connector of one embodiment.
Figure 2:
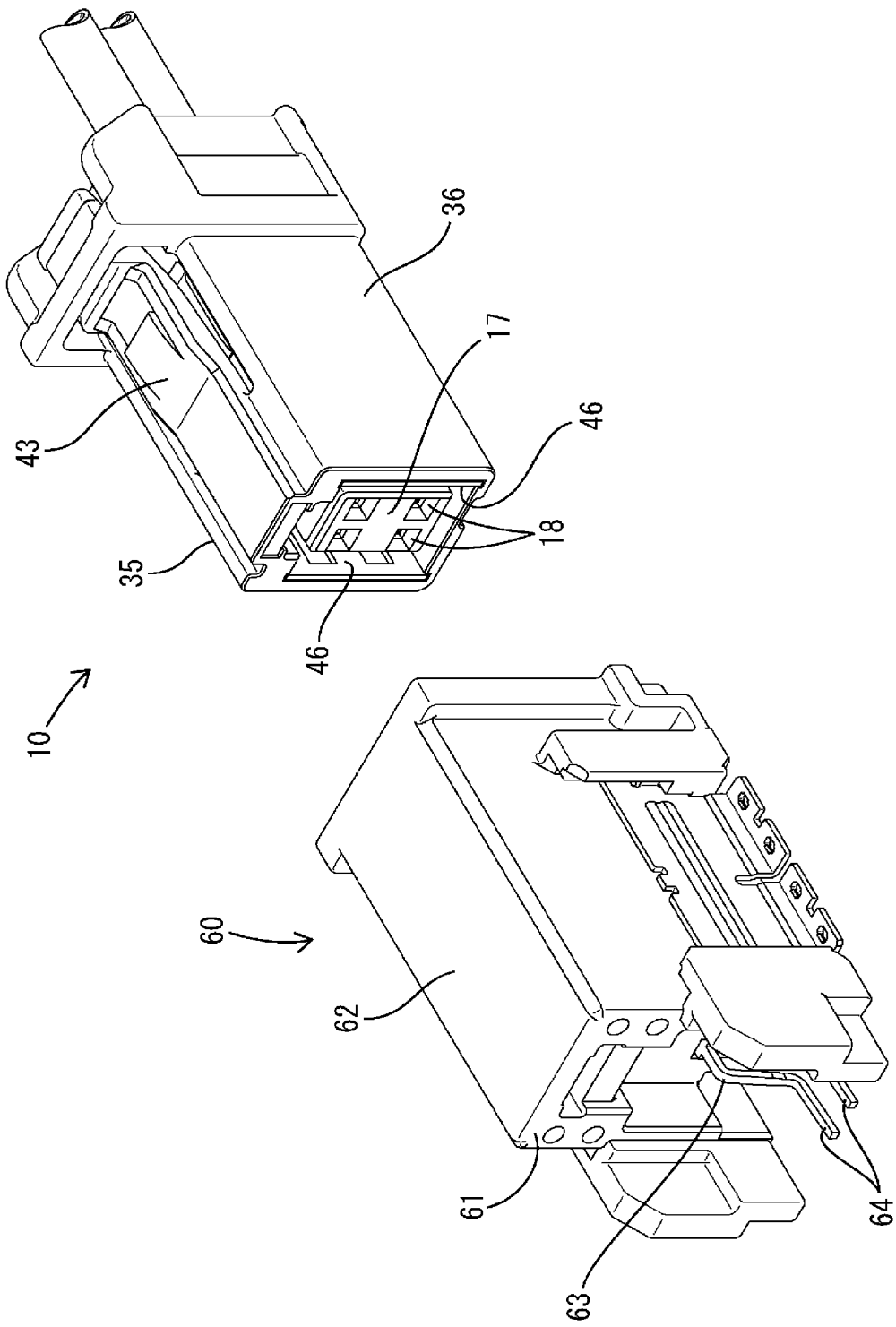
FIG. 2 is a perspective view of a board connector and the branch connector.

A branch connector 10 of this embodiment is connected to an intermediate part of a main line harness 50 and functions to branch a communication circuit 55 from the main line harness 50 as shown in FIG. 1. The main line harness 50 is configured by arranging conductive paths 51A, 51B of two systems formed of coated wires in parallel. Branched parts of each conductive path 51A, 51B serve as divided portions 52 divided to break each conductive path 51A, 51B. A pair of the divided portions 52 in the conductive path 51A are in a non-conductive state without being directly conductive with each other. A pair of the divided portions 52 in the other conductive path 51B are also in a non-conductive state without being directly conductive with each other. As shown in FIG. 7, an insulation coating 53 is removed to expose a conductor 54 in the divided portion 52.

The communication circuit 55 is formed as a printed circuit on the circuit board 56. A board connector 60 is mounted on the circuit board 56. As shown in FIG. 7, the board connector 60 is such that two branch-side terminals 63 are mounted in a board-side housing 61 to be fixed to the circuit board 56. Tabs 67 of the branch-side terminals 63 are accommodated in a receptacle 62 of the board-side housing 61. Out of the branch-side terminal 63, a board connecting portion 64 exposed to the outside of the receptacle 62 is connected to the communication circuit 55. When the branch connector 10 is connected to the board connector 60, the communication circuit 55 is branched from the main line harness 50.

The branch connector 10 includes an inner module 11, the branch housing 35 having a function as a protecting member, and a pair of bilaterally symmetrical shorting members 46. As shown in FIG. 3, the inner module 11 includes a terminal holding member 12 and two pairs of terminal fittings 30. The number of the pairs of the terminal fittings 30 is equal to the number of the systems of the conductive paths 51A, 51B constituting the main line harness 50. That is, two terminal fittings 30 are provided for each of the conductive paths 51A, 51B of the two systems.

The terminal holding member 12 is configured by assembling a body member 13 composed of a vertically symmetrical single component and a pair of vertically symmetrical covers 14. The body member 13 and the covers 14 are components made of an insulating material such as synthetic resin. The body member 13 is formed with four terminal accommodation grooves 15 elongated in the front-rear direction and aligned in the vertical and lateral directions. The terminal accommodation grooves 15 on an upper side are formed by recessing the upper surface of the body member 13, and the terminal accommodation grooves 15 on a lower side are formed by recessing the lower surface of the body member 13. As shown in FIG. 7, a front retaining recess 16F is formed in a front end part of the terminal accommodation groove 15. A rear retaining recess 16R is formed at a position behind the front retaining recess 16F in the terminal accommodation groove 15.

A front wall portion 17 of the body member 13 is formed with four insertion openings 18 individually penetrating from the front end surface of the body member 13 to communicate with the four terminal accommodation grooves 15. A locking groove 19 extending in the lateral direction is formed in the rear surface of each of upper and lower end parts of the front wall portion 17. As shown in FIG. 3, four locking step portions 20 extending in the front-rear direction are formed on both left and right outer side surfaces of the body member 13. The locking step portions 20 are disposed in a region behind a center of the body member 13 in the front-rear direction. Two locking step portions 20 are disposed on each outer side surface of the body member 13 while being spaced apart in the vertical direction.

The body member 13 is formed with four connection holes 21. In a side view of the body member 13 viewed from either left or right, the connection holes 21 have a rectangular opening. The connection holes 21 penetrate from the left and right outer side surfaces to the terminal accommodation grooves 15. The connection holes 21 are disposed in a front end part of the body member 13. In particular, the connection holes 21 are disposed in a region behind the front wall portion 17, i.e. in a region for exposing rectangular tube portions 31 of the terminal fittings 30 to be described later in the front-rear direction.

The cover 14 is a single component including a plate-like portion 22 long in the front-rear direction and a pair of left and right side plate portions 23. A positioning protrusion 24 is formed in a central part in the front-rear direction on the outer surface of the plate-like portion 22. The front surface of the positioning protrusion 24 is inclined with respect to the front-rear direction. The rear surface of the positioning protrusion 24 is perpendicular to the front-rear direction. The pair of left and right side plate portions 23 extend upward or downward at a right angle to the plate-like portion 22 from both left and right side edges of the plate-like portion 22. The side plate portion 23 extends in a direction toward an inner surface side of the plate-like portion 22, i.e. toward a side where the positioning protrusion 24 is not formed. The side plate portion 23 is disposed in a region behind a center in the front-rear direction of the plate-like portion 22. A fitting rib 25 extending in the front-rear direction is formed on an extending end edge part of the inner side surface of the side plate portion 23.

The terminal fitting 30 has a shape elongated in the front-rear direction as a whole. The rectangular tube portion 31 is formed in a front end part of the terminal fitting 30, and a crimping portion 33 in the form of an open barrel is formed in a rear end part of the terminal fitting 30. A front end part of the rectangular tube portion 31 is formed with a front stabilizer 33F projecting in a direction perpendicular to the front-rear direction. A rear end part of the rectangular tube portion 31 is formed with a rear stabilizer 33R projecting in a direction perpendicular to the front-rear direction.

The crimping portion 32 is conductively fixed to the divided portion 52 of the conductive path 51A, 51B by crimping. The terminal fitting 30 fixed to the conductive path 51A, 51B linearly extends from the divided portion 52 of the conductive path 51A, 51B. Two terminal fittings 30 fixed to two divided portions 52 constituting the conductive path 51A, 51B of one system constitute the conductive path 51A, 51B of this one system.

The terminal fittings 30 are held in the body member 13 by being accommodated into the respective terminal accommodation grooves 15 with the covers 14 removed from the body member 13. The terminal fitting 30 accommodated into the terminal accommodation groove 15 is restricted from being relatively displaced in the front-rear direction with respect to the body member 13 by the fitting of the front stabilizer 33F and the front retaining recess 16F and the fitting of the rear stabilizer 33R and the rear retaining recess 16R. A side surface of the rectangular tube portion 31 of the terminal fitting 30 held in the body member 13 is exposed on the outer side surface of the body member 13 in the connection hole 21.

Out of the four terminal fittings 30 held in the body member 13, the two terminal fittings 30 fixed to the two divided portions 52 of the conductive path 51A, 51B of one system are so accommodated into the terminal accommodation grooves 15 as to be vertically arranged. That is, the two terminal fittings 30 fixed to the two divided portions 52 of the conductive path 51A, 51B of one system are so arranged as to be arranged in a direction perpendicular to a length direction of the terminal fittings 30. After the four terminal fittings 30 are mounted into the body member 13, the covers 14 are assembled with the upper and lower surfaces of the body member 13. In assembling the covers 14, the covers 14 are set in a posture oblique to the upper and lower surfaces of the body member 13 and front end edge parts of the covers 14 are fit into the locking grooves 19 of the body member 13. By fitting the front end edge parts of the covers 14 into the locking grooves 19, the covers 14 are restricted from being detached rearward from the body member 13.

After the front end edge part of the cover 14 is fit to the body member 13, the cover 14 is displaced upward or downward toward the body member 13 with the locking groove 19 as a fulcrum and the both left and right side plate portions 23 are overlapped on the both left and right outer side surfaces of the body member 13. When the fitting ribs 25 of the side plate portions 23 are locked to the locking step portions 20 of the body member 13, the assembling of the cover 14 with the body member 13 is completed. The assembled covers 14 close openings of the terminal accommodation grooves 15 in the upper and lower surfaces of the body member 13. The terminal fittings 30 in the terminal accommodation grooves 15 are restricted from coming out from the terminal accommodation grooves 15 by the covers 14. In the above way, the assembling of the terminal holding member 12 and the mounting of the terminal fittings 30 into the terminal holding member 12 are completed, whereby the inner module 11 is configured.

A pair of upper and lower connection holes 21 are open in the left outer side surface of the terminal holding member 12. In this pair of connection holes 21 on the left side, parts of the rectangular tube portions 31 of the two terminal fittings 30 constituting the conductive path 51A, 51B of one system are individually exposed. A pair of upper and lower connection holes 21 are also open in the right outer side surface of the terminal holding member 12. In this pair of connection holes 21 on the right side, parts of the rectangular tube portions 31 of the two terminal fittings 30 constituting the conductive path 51A, MB of the other system are individually exposed. The two pairs of connection holes 21 are formed in regions of the outer surfaces of the body member 13 not covered by the covers 14.

The branch housing 35 is a single component in the form of a rectangular tube made of an insulating material such as synthetic resin. As shown in FIGS. 4 and 5, the branch housing 35 includes a pair of bilaterally symmetrical side wall portions 36, a bottom wall portion 37 coupling the lower end edges of the both left and right side wall portions 36 and an upper wall portion 38 coupling the upper end edges of the both left and right side wall portions 36. The inside of the branch housing 35 functions as a protection space 39 having both front and rear end surfaces open to the outside of the branch housing 35. As shown in FIG. 7, a bottom stopper 40 projecting over the entire width of the bottom wall portion 37 is formed on the inner surface of the bottom wall portion 37.

A resilient retaining piece 42 is formed on the inner surface of the upper wall portion 38. The resilient retaining piece 42 is resiliently relatively displaceable in the vertical direction with respect to the upper wall portion 38. The branch housing 35 is formed with a lock arm 43 covering the outer surface of the upper wall portion 38 while being spaced apart therefrom. The lock arm 43 is cantilevered rearward from the front end part of the branch housing 35 and resiliently deformable in the vertical direction.

As shown in FIG. 5, a pair of upper and lower holding grooves 44 are formed in both upper and lower end parts on the inner side surface of each of the both left and right side wall portions 36. The holding groove 44 is formed in a front end part of the side wall portion 36 and elongated in the front-rear direction. The front end of the holding groove 44 is open to an outer space in front of the branch housing 35. The holding groove 44 in the upper end part is open downward, and the holding groove 44 in the lower end part is open upward. A rear end part of the holding groove 44 is closed and functions as a positioning portion.

The shorting member 46 is a single component formed by bending a rectangular metal plate. As shown in FIG. 4, the shorting member 46 is integrally formed with a pair of upper and lower resilient contact pieces 47. The pair of resilient contact pieces 47 are arranged while being vertically spaced apart. The resilient contact piece 47 is cantilevered to an oblique front inner side from the shorting member 46. An extending end part of the resilient contact piece 47 functions as a contact point portion 48. Press-fit portions 49 in the form of projections are formed on both upper and lower end edge parts of the shorting member 46.

The shorting member 46 is inserted into the protection space 39 from front of the branch housing 35, and mounted in the branch housing 35 by press-fitting the both upper and lower end edge parts of the shorting member 46 into the holding grooves 44. The shorting member 46 mounted in the branch housing 35 is held in a mounted state by the press-fit portions 49 biting into the holding grooves 44. The resilient contact pieces 47 project inward from the shorting member 46. The shorting member 46 mounted in the branch housing 35 is protected from interference with external matters since being accommodated in the protection space 39.

The inner module 11 is mounted into the branch housing 35. In mounting, the inner module 11 is inserted into the protection space 39 from behind the branch housing 35. In an insertion process, the resilient retaining piece 42 is resiliently deformed by interference with the positioning protrusion 24 and the resilient contact pieces 47 are resiliently deformed by interference with the front end edge of the terminal holding member 12. When the inner module 11 is inserted to a proper position of the branch housing 35, the positioning protrusion 24 comes into contact with the bottom stopper 40, whereby the inner module 11 is stopped in front and the resilient retaining piece 42 resiliently returns to lock the positioning protrusion 24. In this way, the inner module 11 is held in the branch housing 35 with a relative displacement in the front-rear direction restricted.

With the inner module 11 mounted at the proper position of the branch housing 35, the resilient contact pieces 47 resiliently return to enter the connection holes 21 and resiliently contact the rectangular tube portions 31 of the terminal fittings 30. The pair of upper and lower resilient contact pieces 47 formed in one shorting member 46 set a state where the two vertically arranged terminal fittings 30 can be shorted. Since the two vertically arranged terminal fittings 30 constitute the conductive path 51A, 51B of one system, the shorting member 46 also constitutes the conductive path 51A, 51B of one system similarly to the two terminal fittings 30. The shorting member 46 and the two terminal fittings 30 shorted by the shorting member 46 constitute one continuous conductive path 51A, 51B. When the inner module 11 is mounted into the branch housing 35, the assembling of the branch connector 10 is completed.

The branch connector 10 is connected to the board connector 60 by being inserted into the receptacle 62. With the both connectors 10, 60 connected, the lock arm 43 of the branch connector 10 is locked to a lock portion 66 formed on the receptacle 62 of the board connector 60, whereby the both connectors 10, 60 are locked in a connected state.

When the both connectors 10, 60 are set in the connected state, the tabs 67 of the two branch-side terminals 63 are inserted into the terminal accommodation grooves 15 on the lower side through the insertion openings 18 and individually connected to the two terminal fittings 30. One branch-side terminal 63 is connected to the terminal fitting 30 on the lower side, out of the two terminal fittings 30 constituting one conductive path 51A, 51B. The other branch-side terminal 63 is connected to the terminal fitting 30 on the lower side, out of the two terminal fittings 30 constituting the other conductive path 51A, 51B. By the connection of the branch-side terminal 63 and the terminal fitting 30, the branch-side terminal 63 and the communication circuit 55 are branched from the conductive path 51A, 51B of each system.

The branch connector 10 of this embodiment includes two pairs of terminal fittings 30, the terminal holding member 12 for holding the two pairs of terminal fittings 30 and two plate-like shorting members 46. The terminal fittings 30 of one pair, out of the two pairs, are fixed to the two divided portions 52 formed at the intermediate positions of the conductive path 51A of one system, out of the two systems. The terminal fittings 30 of the other pair, out of the two pairs, are fixed to the two divided portions 52 formed at the intermediate positions of the conductive path 51B of the other system, out of the two systems. The shorting members 46 are disposed along the outer surface of the terminal holding member 12 and connected to the pairs of terminal fittings 30. The branch-side terminals 63 are connectable to the terminal fittings 30. The branch connector 10 shorts the two terminal fittings 30 constituting the one conductive path 51A by one shorting member 46 and shorts the two terminal fittings 30 constituting the other conductive path 51B by the other shorting member 46. In this way, the conductive paths 51A, 51B are connected by daisy chain connection.

When the branch connector 10 and the board connector 60 are connected, the branch-side terminal 63 and the communication circuit 55 are branched from the conductive path 51A, 51B of one system via the terminal fittings 30. Since the conductive paths 51A, 51B are connected by daisy chain connection by the branch connector 10, a stub length is shortened with the branch-side terminals 63 branched from the branch connector 10 serving as a daisy chain connecting portion. Since the branch-side terminals 63 are directly connected to the terminal fittings 30 constituting the conductive paths 51A, 51B, miniaturization can be realized as compared to the case where other members are interposed between the conductive paths 51A, 51B and the branch-side terminals 63. Since the shorting members 46 are plate-like, miniaturization can be realized also by this configuration.

Since the branch connector 10 includes the branch housing 35 for covering the shorting members 46, the shorting members 46 can be protected by the branch housing 35. Since the shorting members 46 are held on the inner surface of the branch housing 35 in the form of a rectangular tube, the shorting members 46 can be protected by the branch housing 35 even if the inner module 11 is removed from the branch housing 35 to bring the shorting members 46 and the terminal fittings 30 out of contact.

The shorting member 46 is formed with the resilient contact pieces 47 capable of resiliently contacting the terminal fittings 30. By the resilient deformation of the resilient contact pieces 47, dimensional tolerances of the respective components such as the terminal holding member 12, the terminal fittings 30, the branch housing 35 and the shorting members 46 are absorbed. Similarly, by the resilient deformation of the resilient contact pieces 47, assembling tolerances between the terminal holding member 12 and the terminal fittings 30, those between the branch housing 35 and the shorting members 46 and those between the inner module 11 and the branch housing 35 are absorbed. Since these tolerances are absorbed by the resilient deformation of the resilient contact pieces 47, a contact state between the shorting members 46 and the terminal fittings 30 is stabilized.

Since the resilient contact pieces 47 project toward the inner surface side from the shorting member 46, there is a concern that a width of the branch connector 10 increases. However, since the terminal holding member 12 is formed with the connection holes 21 for accommodating the resilient contact pieces 47, clearances between the outer surface of the terminal holding member 12 and the inner surfaces of the shorting members 46 can be narrowed. In this way, miniaturization in the width direction can be realized.

Other Embodiments

The present invention is not limited to the above described and illustrated embodiment and is represented by claims. The present invention is intended to include all changes in the scope of claims and in the meaning and scope of equivalents and also include the following embodiments.

Although two pairs of terminal fittings are provided in one branch connector to branch the conductive paths of two systems in the above embodiment, the number of the systems of the conductive paths to be branched may be one, three or more. Regardless of the number of the conductive paths, as many pairs of terminal fittings as the systems of the conductive paths and as many shorting members as the systems of the conductive paths may be provided in one branch connector to connect the paired terminal fittings by the shorting members.

Although the branch housing serving as the protecting member surrounds not only the shorting members, but also the entire terminal holding member in the above embodiment, the protecting member may cover only the shorting members and at least partially expose the terminal holding member.

Although the shorting members are held on the branch housing serving as the protecting member in the above embodiment, the shorting members may be held on the outer surface of the terminal holding member.

Although the shorting members are formed with the resilient contact pieces configured to resiliently contact the terminal fittings in the above embodiment, the shorting members may not include the resilient contact pieces. In this case, if the terminal fittings are formed with resilient parts capable of resiliently contacting the shorting members, the contact state between the terminal fittings and the shorting members can be stabilized.

Although the terminal holding member is formed with the connection holes for accommodating the resilient contact pieces in the above embodiment, projections of the terminal fittings may be accommodated into the connection holes of the terminal holding member and the resilient contact pieces of the shorting members may contact these projections.

Although, out of the body member and the covers constituting the terminal holding member, the body member is formed with the connection holes in the above embodiment, the connection holes may be formed in the covers.

LIST OF REFERENCE NUMERALS 10 branch connector
11 inner module
12 terminal holding member
13 body member
14 cover
15 terminal accommodation groove
16F front retaining recess
16R rear retaining recess
17 front wall portion
18 insertion opening
19 locking groove
20 locking step portion
21 connection hole
22 plate-like portion
23 side plate portion
24 positioning protrusion
25 fitting rib
30 terminal fitting
31 rectangular tube portion
32 crimping portion
33F front stabilizer
33R rear stabilizer
35 branch housing (protecting member)
36 side wall portion
37 bottom wall portion
38 upper wall portion
39 protection space
40 bottom stopper
42 resilient retaining piece
43 lock arm
44 holding groove
46 shorting member
47 resilient contact piece
48 contact point portion
49 press-fitting portion
50 main line harness
51A conductive path
51B conductive path
52 divided portion
53 insulation coating
54 conductor
55 communication circuit
56 circuit board
60 board connector
61 board-side housing
62 receptacle
63 branch-side terminal
64 board connecting portion
66 lock portion
67 tab

What is claimed is:

1. A branch connector, comprising:
two pair of terminal fittings fixed to a divided portion at an intermediate position of a conductive path;
a terminal holder that holds the two pair of terminal fittings;
two shorting plates disposed respectively along both outer surfaces of the terminal holder that face each other, the two shorting plates being connected to the two pair of terminal fittings, respectively; and
a branch housing in a form of a rectangular tube that covers the two shorting plates,
wherein:
the two pair of terminal fittings and the terminal holder are accommodated in the branch housing,
the two shorting plates are held on an inner surface of the branch housing, and
two branch-side terminals are connectable to the two pair of terminal fittings, respectively.

2. A branch connector, comprising:
two pair of terminal fittings fixed to a divided portion at an intermediate position of a conductive path;
a terminal holder that holds the two pair of terminal fittings; and
two shorting plates disposed respectively along both outer surfaces of the terminal holder that face each other, the two shorting plates being connected to the two pair of terminal fittings, respectively; and
wherein:
each of the two shorting plates is formed with a pair of resilient contact pieces capable of resiliently contacting a pair of terminal fittings,
the terminal holder is formed with two pair of connection holes open to individually expose the two pair of terminal fittings, one of the two pair of connection holes accommodating the pair of resilient contact pieces, and
two branch-side terminals are connectable to the two pair of terminal fittings, respectively.

3. The branch connector of claim 1, wherein the branch housing includes a pair of bilaterally symmetrical side wall portions,
a pair of upper and lower holding grooves are formed in both upper and lower end parts on an inner side surface of each of the pair of side wall portions, and
each of the two shorting plates is mounted in the branch housing by press-fitting both upper and lower end edge parts thereof into the pair of upper and lower holding grooves.

4. The branch connector of claim 3, wherein press-fit portions in a form of projections are formed on the both upper and lower end edge parts of each of the two shorting plates.

* * * * *